United States Patent [19]

Blackwell

[11] Patent Number: 5,335,441
[45] Date of Patent: Aug. 9, 1994

[54] LURE PROTECTION DEVICE

[76] Inventor: Russell Blackwell, 2109 Arcadia Rd., Birmingham, Ala. 35214

[21] Appl. No.: 52,625

[22] Filed: Apr. 27, 1993

[51] Int. Cl.$^5$ .................................. A01K 85/00
[52] U.S. Cl. .......................... 43/42.36; 43/42.39
[58] Field of Search ............... 43/43.36, 42.4, 43.1, 43/42.36, 42.39, 44.9; 403/379

[56] References Cited

U.S. PATENT DOCUMENTS

| | | | |
|---|---|---|---|
| 4,176,815 | 12/1979 | Davidson | 403/349 |
| 4,305,180 | 12/1981 | Schwartz | 403/349 |
| 5,040,325 | 8/1991 | Herrmann | 43/42.4 |
| 5,090,151 | 2/1992 | Salminen | 43/42.36 |
| 5,152,094 | 10/1992 | Strickland | 43/42.36 |

FOREIGN PATENT DOCUMENTS 683025  2/1965  Italy ...................... 403/349

*Primary Examiner*—Kurt C. Rowan
*Attorney, Agent, or Firm*—Veal & Associates

[57] ABSTRACT

An apparatus for protecting and prolonging the functional life-span of artificial fishing lures comprising a tubular body having a cylindrical portion integrally connected to a conically tapered portion which tapers radially inwardly to define an orifice. A bayonet styled slot is defined in the wall of said cylindrical portion and extends a predetermined distance from said open end toward said orifice. The bayonet slot is comprised of a longitudinal portion, an annular portion and a notch. The longitudinal portion may instead be a helical portion helically oriented along the wall of said cylindrical portion. A fishing line is threaded through the orifice in the conically tapered portion, then through a weight, then tied to an eyelet on a hook which is attached to a lure. The combination of weight, hook and lure is then concomitantly urged into said tubular body such that the weight frictionally engages the internal surface of the conically tapered portion. The hook is received in or guided by the bayonet slot and is captured within the tubular body by pushing it into the annular portion of the bayonet slot then slightly turning it so that it will extend from the notch. An adhesive is applied to the external surface of the weight for enhancing the securement thereof to the internal surface of the conically tapered portion.

8 Claims, 1 Drawing Sheet

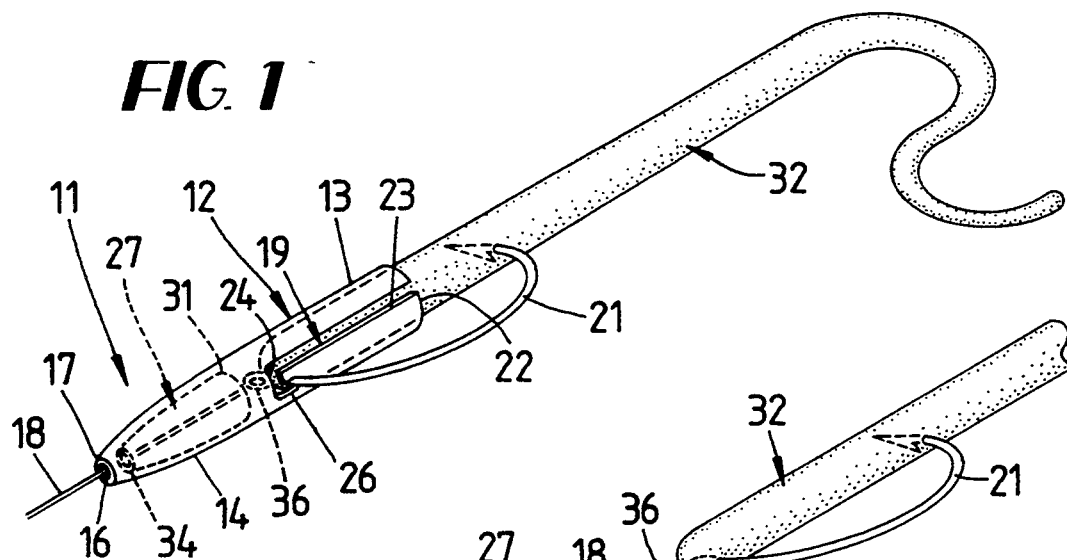
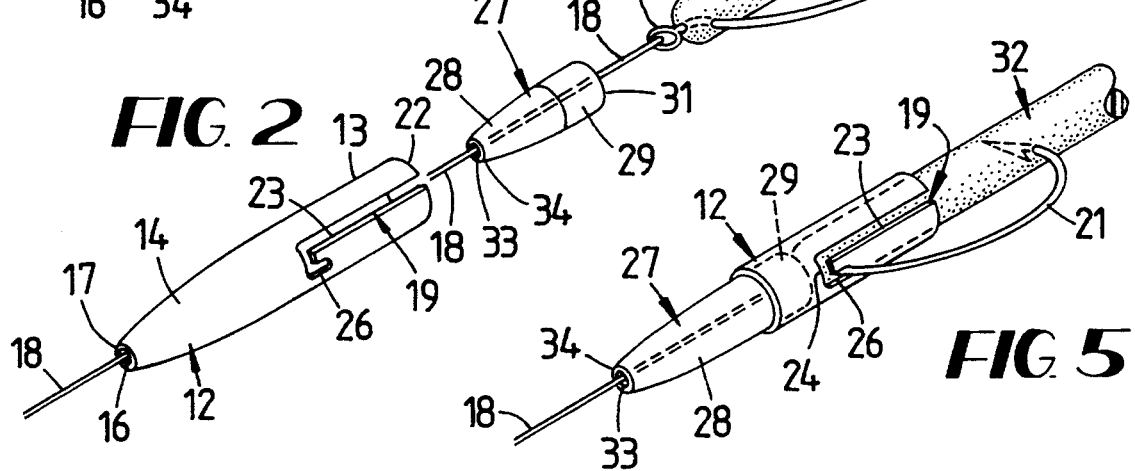
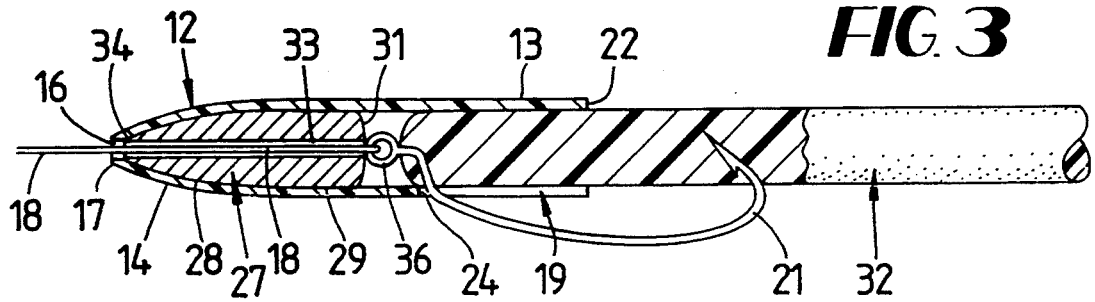
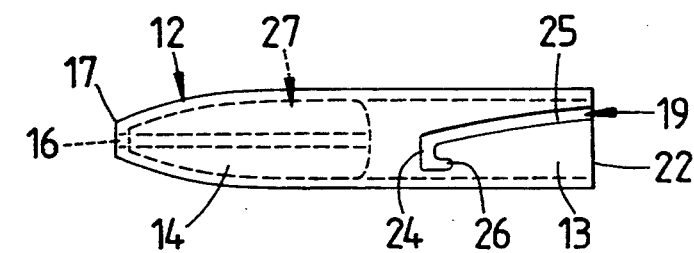

LURE PROTECTION DEVICE

FIELD OF THE INVENTION

The present invention relates to artificial fishing lures and more particularly to a new and improved device for protecting artificial fishing lures during use thereby extending the lure's useful life-span while also providing a more secure platform for the weight and lure. In even greater particularity, the present invention relates to a new and improved device for protecting artificial fishing lures having a generally tubular body with a bayonet-type slot which insertably and frictionally receives a weight and lure.

BACKGROUND OF THE INVENTION

The repeated use of an artificial fishing lure often results in the lure becoming damaged or lost. A lure is generally attached to the fishing line by means of metal hooks tied to the fishing line and then embedded in the lure. Over time, the hooks pull free of the lure by tearing through the soft lure material thus destroying the lure.

Ballast weights are frequently used in conjunction with lures to ensure that the lure and hook concomitantly sink into the water at the appropriate rate and with a proper orientation. The weight is often attached to the fishing line in close proximity to the lure. This combination of weight and lure is, however, vulnerable in the water to snagging on rocks or other debris. Also, by having the weight in a position on the fishing line separate from the lure, the fisherman is presented with a combination that does not provide a secure platform for the tackle. It is difficult to handle and to cast given the limited area of use such as on a boat.

Therefore, what is desired and provided by the present invention, is a means for securing the weight to the lure in such a manner as to protect the lure during use, thereby extending the lure's useful life-span while also providing a more secure platform for the weight and lure. While the above mentioned devices and methods are suited for their intended usage, none of them are capable of providing a new and improved lure protection device.

SUMMARY OF THE INVENTION

In view of the foregoing disadvantages inherent in the known types of lures, the present invention provides a new and improved device for protecting artificial fishing lures during use thereby extending the lure's useful life-span while also providing a more secure platform for the weight and lure. As such, the principal object of the present invention, which will be described subsequently in greater detail, is to provide a new and improved protection device for lures which has all of the advantages of the prior art devices and methods and none of the disadvantages.

It is another object of the present invention to provide a new and improved lure protection device which may be easily and efficiently manufactured and marketed.

It is a further object of the present invention to provide a new and improved lure protection device which is of durable and reliable construction.

An even further object of the present invention is to provide a new and improved lure protection device which is susceptible of a low cost of manufacture with regard to both materials and labor, and which is susceptible of low prices of sale to the consuming public, thereby making such device economically available to the buying public.

Still another object of the present invention is to provide a new and improved lure protection device for easy and reliable use by fishermen of all ages.

Even still another object of the present invention is to provide a new and improved lure protection device which allows the fisherman to avoid spending valuable time trying to extricate a lure that has been entangled on branches, rocks or other debris in or on the water.

It is a further object of the present invention to assist or enhance the lifelike appearance of the lure.

Yet a further object of the present invention is to provide a new and improved lure protection device that is manufactured in various sizes so that it can accommodate different size lures and weights which, in turn, meets individual fishing needs.

These and other objects are accomplished through the use of a generally tubular sleeve that will receptively accommodate a weight and lure in such a manner as to protect each from the rigors of continued use. The sleeve is formed as a tube having a cylindrical portion defining a substantially circular opening at one end thereof and integrally connected to a substantially conical shaped portion at its opposite end.

In a first embodiment, the conical shaped portion tapers radially inwardly to define an orifice at its tip. The size of the orifice is such that only a fishing line may pass therethrough. In a second embodiment, the conical shaped portion also tapers radially inwardly to define an orifice. However, the size of the orifice in the second embodiment allows a weight to partially protrude out of the sleeve through the orifice when it is wedged or urged into immobile frictional abutment with the internal surface of the conical shaped portion. In both embodiments, the orifices defined by the conical shaped portion and the circular opening defined by the cylindrical portion are in substantial co-axial alignment.

The cylindrical portion of the sleeve also defines a novel bayonet-type slot from which the hook will emerge after final assembly and during use. Generally speaking, the bayonet slot is "L" shaped and is formed in the wall of the cylindrical portion and extends a predetermined distance along the wall from the circular opening toward the conical shaped portion.

The bayonet slot is comprised of a longitudinal portion, annular portion and a notch. The longitudinal portion is substantially parallel to the center axis of the tubular sleeve. Alternatively, a helical portion, which follows a helical type path along the wall of the cylindrical portion, may be used in place of the longitudinal portion. The annular portion is integrally connected to either the longitudinal portion or the helical portion at their furthermost point from the circular opening. The bayonet slot terminates in the notch which is integrally connected to the annular portion and extends toward the circular opening in a substantially co-parallel relation with the center axis of the tubular sleeve.

The present invention is assembled by threading a fishing line through the orifice at the tip of the conical shaped portion of the sleeve. The line is then threaded through a weight where it is then tied to the eyelet of a hook. The point of the hook is then inserted or embedded into a lure such that the lure is securely attached to the hook. The combination of hook, lure and weight is then urged into the tubular sleeve such that the weight is placed in frictional contact with the interior surface of the conical shaped portion. During the above-described insertion maneuver, the hook follows or is guided along, and extends from, the bayonet-type slot.

Insertion of the combination into the sleeve is accomplished by holding the sleeve in one hand while pulling the fishing line with the other hand. This urges the eyelet of the hook into contact with the weight forcibly inserting the whole combination into the sleeve. The weight is frictionally wedged into immobile abutment with the internal surface of the conical shaped portion. The hook is then firmly secured or captured within the sleeve by pushing it into the annular portion of the slot and then giving it a slight turn so that it will extend from the notch.

There has thus been outlined, rather broadly, the more important features of the invention in order that the detailed description thereof that follows may be better understood, and in order that the present contribution to the art may be better appreciated. There are, of course, additional features of the present invention that will be described hereinafter and which will form the subject matter of the claims appended hereto. In this respect, before explaining the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

The foregoing objects and advantages of the present invention for a new and improved device for protecting artificial fishing lures will be more readily understood by one skilled in the art by referring to the following detailed description of a preferred embodiment and to the accompanying drawings which form a part of this disclosure, and wherein:

FIG. 1 is a perspective view of the present invention showing its relationship with the lure, hook, weight and fishing line after final assembly and during use.

FIG. 2 shows the components in the assembly of the present invention before the weight, hook and lure are urged into the sleeve by means of the fishing line.

FIG. 3 is a cross sectional view of the present invention showing the relationship of the assembled components.

FIG. 4 is a top plan view of the present invention with a representation of the bayonet-type socket with a helical slot extending from the circular opening.

FIG. 5 is a perspective view of a second embodiment of the present invention showing a partially tapered sleeve and its relationship with the lure, hook, weight and fishing line after final assembly and during use.

DETAILED DESCRIPTION OF THE PREFERRED EMBODIMENT

Referring to the drawings for a clearer understanding of the present invention, the lure protection device as shown in FIG. 1, which is the subject of this application, is referred to generally at 11 and contemplates the use of a generally tubular sleeve 12 which is comprised of a cylindrical portion 13 integrally connected to a substantially coaxial conically tapered portion 14.

In the first embodiment, shown in FIGS. 1-4, the conically tapered portion 14 tapers radially inwardly defining an orifice 16 at tip 17. The size of orifice 16 is such that only a fishing line 18 may pass therethrough.

The cylindrical portion 13 of sleeve 12 defines a novel bayonet slot 19 in its wall from which a hook 21 will emerge after final assembly and during use. Slot 19 extends a proximal distance along the wall of cylindrical portion 13 from an open end 22 defined by the cylindrical portion 13.

Slot 19 is comprised of a longitudinal portion 23, annular portion 24 and a notch 26. As shown in FIGS. 1, 2 and 5, longitudinal portion 23 is substantially parallel to the center axis of sleeve 12. Alternatively, as shown in FIG. 4, a helical portion 25, which follows a helical-type path along the wall of cylindrical portion 13, may be utilized in place of longitudinal portion 23. Annular portion 24 is integrally connected to either the longitudinal portion 23 or the helical portion 25 at the furthermost point from open end 22. Slot 19 terminates in the notch 26 which is integrally connected to the annular portion 24 and extends toward open end 22 in a substantially co-parallel relation to the center axis of sleeve 12.

Similar to sleeve 12, a weight 27 comprises a conical portion 28 integrally connected to a cylindrical portion 29 defining an end 31 at the end distal said conical portion 28. Weight 27 will usually be composed of lead or another metal, however, it is sufficient if weight 27 counters the natural buoyancy of a lure 32 and allows the tackle to submerge. Moreover, weight 27 defines a cylindrical passage 33 therethrough extending substantially axially from a tip 34 defined by conical portion 28 to the proximate center of end 31. The size of cylindrical passage 33 is such that only a fishing line 18 may totally pass therethrough.

The present invention is assembled by threading a fishing line 18 through orifice 16 of conically tapered portion 14 of sleeve 12, then through the axial cylindrical passage 33 of weight 27 where it is then tied to an eyelet 36 on hook 21. Hook 21 is then embedded in or attached to a lure 32. The combination of hook 21, lure 32 and weight 27 is then urged into sleeve 12 such that weight 27 is placed in frictional contact with the interior surface of the conically tapered portion 14. During the insertion of the above described combination into sleeve 12, the hook 21 is directed by and extends from slot 19.

As discussed above, note that in the first embodiment as shown in FIGS. 1-4, the conically tapered portion 14 tapers radially inwardly to define orifice 16 that is of a size which allows for passage therethrough of only the fishing line 18. In a second embodiment as portrayed in FIG. 5, orifice 16 is of a size which allows a portion of the conical portion 28 of weight 27 to protrude from sleeve 12 through orifice 16 when finally assembled. In both embodiments, orifice 16 of the conically tapered portion 14 and open end 22 of cylindrical portion 13 are in substantial co-axial alignment.

Final assembly of both embodiments is accomplished by urging the fishing line 18 taut until hook 21, which is attached to lure 32, are both received within sleeve 12, hook 21 being guided by slot 19. At the same time, eyelet 34 of hook 21 will contact weight 27 causing weight 27 to be frictionally wedged or urged into conical immobile abutment with the interior surface of the conically tapered portion 14 of sleeve 12. Hook 21 will extend out of sleeve 12 through slot 19 and will be secured in sleeve 12 by means of notch 26.

Before weight 27 is wedged or urged into conical abutment with the interior surface of the conically tapered portion 14 of sleeve 12, an adhesive (not shown) may be applied to the external surface of weight 27 for enhancing the securing of it into conical abutment with sleeve 12. The adhesive means used can be any general purpose glue or cement but it is preferred that the adhesive used be insoluble in water.

Adhesive, while useful, is not necessary to the practicing of the invention in that weight 27 may frictionally or loadably engage the interior surface of conically tapered portion 14 of sleeve 12. Weight 27 is held in loaded position by the tension on fishing line 18 and by the reaction force placed on it by eyelet 34 when hook 21 has engaged notch 26.

While a specific form of the invention has been described and illustrated, it is to be understood that the invention may be varied, within the scope of the claims, without departing from the spirit of the invention. Changes and innovations of this type are deemed to be circumscribed by the scope of the invention, except as the same may be necessarily limited by the claims.

Having set forth the nature of the present invention, what is claimed is:

1. An apparatus for protecting and prolonging the functional life-span of artificial fishing lures in combination with a fishing line and hook attached thereto, comprising:
   (a) a generally tubular body having a cylindrical portion, defining an open end, integrally connected to a conically tapered portion which tapers radially inwardly to define an orifice distal said open end; and
   (b) a bayonet slot defined in said cylindrical portion extending from said open end toward said orifice, said line passing through said orifice in said tubular body and connected to an eyelet of said hook, such that a lure, attached to said hook at the end distal said eyelet, and said hook may be concomitantly urged into said tubular body and captured therein by slightly turning said tubular body until said hook is retained by said bayonet slot.

2. An apparatus for protecting and prolonging the functional life-span of artificial fishing lures in combination with a hook attached to a fishing line comprising:
   (a) a generally tubular body having a cylindrical portion, defining an open end, integrally connected to a conically tapered portion which tapers radially inwardly to define an orifice distal said open end;
   (b) a weight received by said tubular body through said open end, said weight having a passage extending through it;
   (c) a bayonet slot defined in said cylindrical portion extending from said open end toward said orifice; wherein said fishing line passes through said orifice and said weight for attachment to an eyelet on said hook, such that said weight, said hook and said lure may be concomitantly urged into said tubular body and captured therein by slightly turning said tubular body until said hook is retained by said bayonet slot, and said weight is wedged into frictional immobile abutment with an internal surface of said conically tapered portion, said internal surface being sufficiently adapted to frictionally receive said weight.

3. An apparatus as defined in claim 2 wherein said bayonet slot comprises:
   (a) a longitudinal portion;
   (b) an annular portion integral with said longitudinal portion distal said open end; and
   (c) a notch integral with said annular portion extending toward said open end.

4. An apparatus as defined in claim 2 wherein said bayonet slot comprises:
   (a) a helical portion;
   (b) an annular portion integral with said helical portion distal said open end; and
   (c) a notch integral with said annular portion extending toward said open end.

5. An apparatus as defined in claim 2 wherein said bayonet slot is "L" shaped.

6. An apparatus as defined in claim 2 wherein said orifice in said conically tapered portion is of a size such that only a fishing line may pass therethrough.

7. An apparatus as defined in claim 2 wherein said orifice is of a size that allows a portion of said weight to protrude therethrough when urged into frictional abutment with an internal surface of said conically tapered portion.

8. An apparatus as defined in claim 2 further comprising an adhesive means used for engaging an interior of said conically tapered portion with said weight.

* * * * *